(12) United States Patent
Oxley

(10) Patent No.: US 6,671,350 B1
(45) Date of Patent: *Dec. 30, 2003

(54) MULTIPLE IDENTIFICATION ACCESS CODES FOR A SINGLE DATA FILE

(75) Inventor: L. Thomas Oxley, Riverwoods, IL (US)

(73) Assignee: Life Sciences & Technology Inc., Deerfield, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/543,180

(22) Filed: Apr. 5, 2000

Related U.S. Application Data

(63) Continuation-in-part of application No. 09/373,320, filed on Aug. 12, 1999.

(51) Int. Cl.$^7$ ............................................. H04M 11/04
(52) U.S. Cl. .............................. 379/45; 379/51; 379/38
(58) Field of Search ........................ 379/37–51

(56) References Cited

FOREIGN PATENT DOCUMENTS

DE              3826243        * 8/1989 .................. 379/45

* cited by examiner

*Primary Examiner*—Wing F. Chan
(74) *Attorney, Agent, or Firm*—Michael D. Rechtin; Foley & Lardner

(57) ABSTRACT

Systems, methods and devices for the communication of emergency information are disclosed. A subscriber to an emergency information data base places an emergency call. The communication device used by the subscriber sends an identifying message in a variety of formats, allowing an emergency response system to access the emergency information data base through a variety of means to obtain, for example, the medical history of the subscriber. Alternatively, the communications device has direct access to the data base. The communication device has a variety of features to enhance the communication of emergency information.

15 Claims, 8 Drawing Sheets

MULTIPLE IDENTIFICATION ACCESS CODES FOR A SINGLE DATA FILE

This application is a continuation-in-part of previously filed application, Ser. No. 09/373,320, filed Aug. 12, 1999, of which the benefit of priority is claimed.

FIELD OF THE INVENTION

The present invention relates generally to emergency communication systems. More specifically, the present invention relates to systems, methods and devices for communicating emergency information associated with one or more individuals. Still more specifically, the present invention relates to systems, methods and devices for communicating emergency medical information to emergency response operators, emergency medical technicians and physicians by using a medical data base and unique identifier communicated over a communications network. More particularly, the invention relates to a method and system for communicating emergency information, such as medical information for medical assistance, for one or more subscribers wherein the subscriber(s) can enable access to their medical data base through any communications device identified with one or more subscribers. Emergency personnel can then retrieve all medical records associated with a particular communications device enabling the emergency personnel to have all possible records no matter how many persons are of an identified group in need of assistance.

BACKGROUND OF THE INVENTION

The Bureau of Census, 1995 *Report* lists that 21 Million households are composed of Americans of 65 years of age or older. Based on information from the 1997 *Statistical Abstract of the United States*, in 1996 Americans paid ninety-six million visits to seek treatment in the nations' emergency rooms. Of those, three hundred thousand were dead on arrival or died in the emergency room, thirteen million were admitted to the general hospital or to intensive and critical care units of the hospital and thirty-eight million individuals required referral to a physician for further treatment. There are nearly seven million automobile accidents in the U.S. each year causing forty thousand deaths and three million injuries. Seven hundred fifty thousand Americans die annually of heart disease and seven hundred thousand males and five hundred thousand females between the ages of 45 years to 65 years who are admitted to hospitals are newly diagnosed with heart problems. Twenty-eight million Americans are diagnosed with high blood pressure, which is the leading cause of strokes and disability. Nine million Americans have been diagnosed with diabetes, an estimated six million Americans are undiagnosed, and all have the risk of episodic hypoglycemia and severe life-threatening complications.

In many circumstances emergency medical personnel are confronted with critically ill individuals who are unable to communicate essential information. Such information includes pre-existing conditions, prescriptions, over-the-counter medications, allergies, etc. When available, this simple medical history can provide emergency medical personnel with a critical life saving edge.

The ability to disseminate an individual's current medical history information to a plurality of unrelated medical care providers with limited delay is of particular value. Most physicians, hospitals, laboratories and pharmacies have computer data base systems that contain patient medical histories. However, these systems are generally not connected to one another. This lack of information sharing between unrelated and sometimes competitive health care providers creates a situation that compromises the health of individuals in medical emergencies.

The lack of information available to emergency medical personnel also delays treatment and increases the cost of medical care. Ignorance of a patient's medical history creates the necessity for physicians to perform laboratory and diagnostic tests on a high-cost immediate basis, and can delay the diagnosis and treatment of an individual in medical distress. Because the physician is required to guess the patient's history, there is a high probability that redundant testing will be performed. The availability of an individual's medical information, even if the individual has no previous medical problems, can provide emergency physicians with an enhanced ability to accurately diagnose and treat that individual on a timely and cost-effective basis.

Current emergency response systems provide no caller-specific emergency medical information to emergency response personnel. An advanced metropolitan 911 system, for example, might operate as follows: A distressed individual dials 911 from a home telephone. The call is routed over the Public Switched Telephone Network (PSTN) to the 911 Trunk. At a Public Service Answering Point (PSAP), the call is answered by an Automatic Call Distributor (ACD). The ACD routes the call to the first available 911 operator and then queries a telephone company data base for automatic number identification (ANI) and automatic location information (ALI). The operator determines the nature of the emergency, dispatching appropriate emergency response teams (fire, ambulance, etc.) to the scene.

While the ANI and ALI information can be helpful to emergency response personnel, it is often incomplete. The ANI/ALI data bases cannot specifically identify the person making the call (it may be a guest or any member of a household), much less provide useful medical information. In addition, the ANI/ALI data base may not be able to provide any information for mobile phone users, especially those roaming out of region. In non-urban regions (which include most of the geographic area of the United States), the ANI/ALI data base and call-handling equipment is frequently not available, and emergency calls are routed without caller information directly to state or county law enforcement authorities or private emergency service providers.

Thus there is a need to provide emergency medical data to emergency response personnel on a real time basis, over a wide geographic area and through a multiplicity of technologies. Several attempts to provide real time emergency medical information have been made. These attempts range from simple and limited body-tagging (the EM bracelet or medical card, for example), to relatively sophisticated systems involving telecommunications technology. To date, however, no such system has been able to provide comprehensive medical information through a variety of telecommunication technologies, over an extensive geographic area, in a fast and secure manner.

SUMMARY OF THE INVENTION

It is therefore an object of the present invention to provide improved systems, methods and devices for the provision of emergency information on a real time basis.

It is a further object of the present invention to provide improved systems, methods and devices for the provision of emergency medical information from any one of a plurality of communications devices.

It is a further object of the present invention to provide improved systems, methods and devices for the provision of emergency information for a selected subscriber by identifying that subscriber by any associated communications device and/or an access code associated with the subscriber.

It is a further object of the present invention to provide improved systems, methods and devices for the provision of emergency information for a group of individuals and selected individuals of the group by use of associated communications devices and/or security codes.

It is a further object of the present invention to provide improved systems, methods and devices for the provision of emergency information for an individual from at least one of the communications media of a telephone, a pager, a computer and a dedicated communications device.

It is a further object of the present invention to provide improved systems, methods and devices for providing emergency information for a group of individuals in a living or business unit or traveling together in a group, such as by car or other transport medium, by associating a communications device number (such as a telephone number, cellular number or computer) with the emergency information of all persons of the group.

It is a further object of the present invention to provide improved systems, methods and devices for the provision of emergency information that is independent of the record keeping formats and restrictions of different medical care providers.

It is a further object of the present invention to provide improved systems, methods and devices for the provision of emergency information to care providers as quickly as current emergency response communication technology will allow.

It is a further object of the present invention to provide improved systems, methods and devices for the provision of emergency information in a manner that limits the actions and time necessary for such communication by the person in distress.

It is a further object of the present invention to provide improved systems, methods and devices for the automatic communication of the location of an emergency to care providers.

It is a further object of the present invention to provide improved systems, methods and devices to keep emergency information up to date.

It is a further object of the present invention to provide a device to allow users to contact emergency response systems within wide geographic regions and through a variety of technologies.

It is also an object of the present invention to provide improved systems, methods and devices for conveying non-emergency information stored in a data base over a wireless telecommunications system.

The features of the present invention that are believed to be novel are set forth with particularity in the appended claims. The invention, together with further objects and advantages thereof, may be best understood by reference to the following description taken in conjunction with the accompanying drawings, wherein.

DESCRIPTION OF THE PREFERRED EMBODIMENTS

The present invention is directed to allowing access to emergency information through what are considered to be standard emergency response telephone systems. These systems, however, work by a variety of different means, spanning a spectrum of technological evolution. Differences in technology between emergency response systems effectively create barriers to the automatic communication of information. Automatic communication, which requires minimal or no human time or attention, is often the only practical means of communication for those in acute medical distress. The present invention includes novel methods, systems and devices for automatically providing access to an emergency information data base, regardless of the technological barriers that arise from the presence of a multiplicity of communication systems. This is achieved by the communication of identifying messages in a variety of formats, wherein at least one of the formats will be accessible to the emergency response system. The emergency response system then has the option of retrieving emergency information through a variety of means, at least one of which will be usable by the system. The present invention could be dependent upon the use of a number of technologies which are well known in prior art, and those of skill in the art will recognize the many possible embodiments that are achievable by varying such support technologies.

Figure 1:
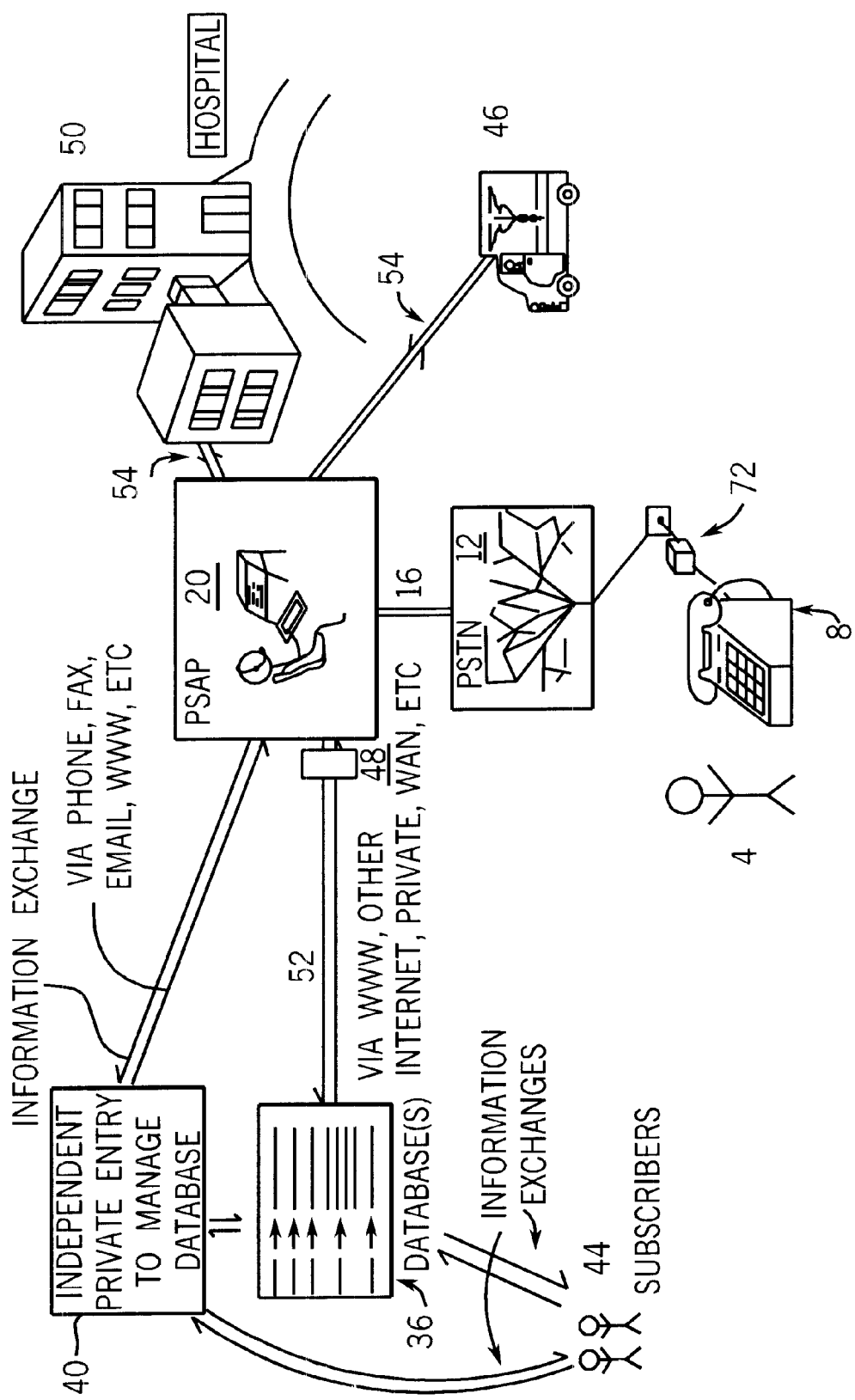
FIG. 1 is a system organization block diagram of a preferred embodiment of the present invention.

FIG. 1 is a block diagram of one preferred embodiment of the present invention. Entity 40 maintains one or more emergency information data bases 36 (referred to hereinafter in the singular). The data base 36 can be any of a variety of configurations known to those skilled in the art and readily available commercially. Subscribers 44 to the data base 36 provide information to the entity 40, which can be entered by the entity 40, by the subscribers 44 or by medical care providers (not shown). The information can be limited, such as name, next of kin and insurer, or can be extensive, for example, a full medical history. The data base 36 can be indexed by a code unique to each subscriber 44 or family, or can be indexed by name, phone number or other suitable identifier. Preferably the subscriber's index is assigned to provide for the secure storage of information. For instance, the index can be a randomly chosen sequence of characters.

Preferably the entity 40 is able to provide national or global data base management and communication services. In the preferred embodiment, the entity 40 would have the ability to communicate with PSAPs via a variety of real time communication means, including telephone, FAX, email, FTP, the World Wide Web, direct MODEM connections or over non-Internet networks such as private or subscriber ATM WANs, etc.

Distressed subscriber 4 places an emergency phone call in, for the sake of example, a metropolitan area. The call is routed over a PSTN 12 to a 911 Trunk 16, to be answered at a PSAP 20. A subscriber's phone 8 can, by means of a module 72 shown in more detail in FIG. 7, transmit an aural message and a decodable message communicating the subscriber's name, the existence of an emergency situation, and the identifying information required to access the medical data base 36. The messages can also be configured to contain basic medical information that may be critical to emergency response units.

For example, the aural message can be a verbal message in the following format: "My name is John Doe. I'm having a medical emergency. I am a subscriber to X Company's medical information service, access code 718529G4. I am a diabetic." In the context of the present invention, "aural" means conveying some meaningful content to a human listener without the aid of a decoding device.

A decodable message, on the other hand, would be indecipherable to a human listener without a decoder, and can, for example, be sent as a digital burst. Automatic emergency response answering equipment can be configured to read the burst and automatically request information from the data base 36 over a communications bridge 48 and a communication network 52, such as the Internet. The information can then be printed, displayed or stored for use by the PSAP 20. Thus, one of the principal advantages of a decodable message lies in enabling advanced emergency call-handling equipment to access the emergency data base 36 automatically (through a variety of means to be described later) without complicated speech recognition software. The decodable signal can thus be used alone where there is a reasonable assurance that most of the emergency response systems needed by a user will be able to use and understand the decodable signal.

In contrast, the aural message trades speed for robustness. The vast majority of the geographic area of the United States does not have advanced emergency call-handling capability. A rural PSAP, for example, may consist simply of a county sheriff's office. Such PSAPs do not have advanced call-handling equipment to decipher a decodable message and request medical information automatically. An aural message, however, will still allow such PSAPs to access the emergency information data base 36 simply by having the phone answerer listen to the message or, if the message was missed, by listening to emergency phone call recordings. The aural message thus provides a least common denominator message for emergency response system technologies.

Figure 2:
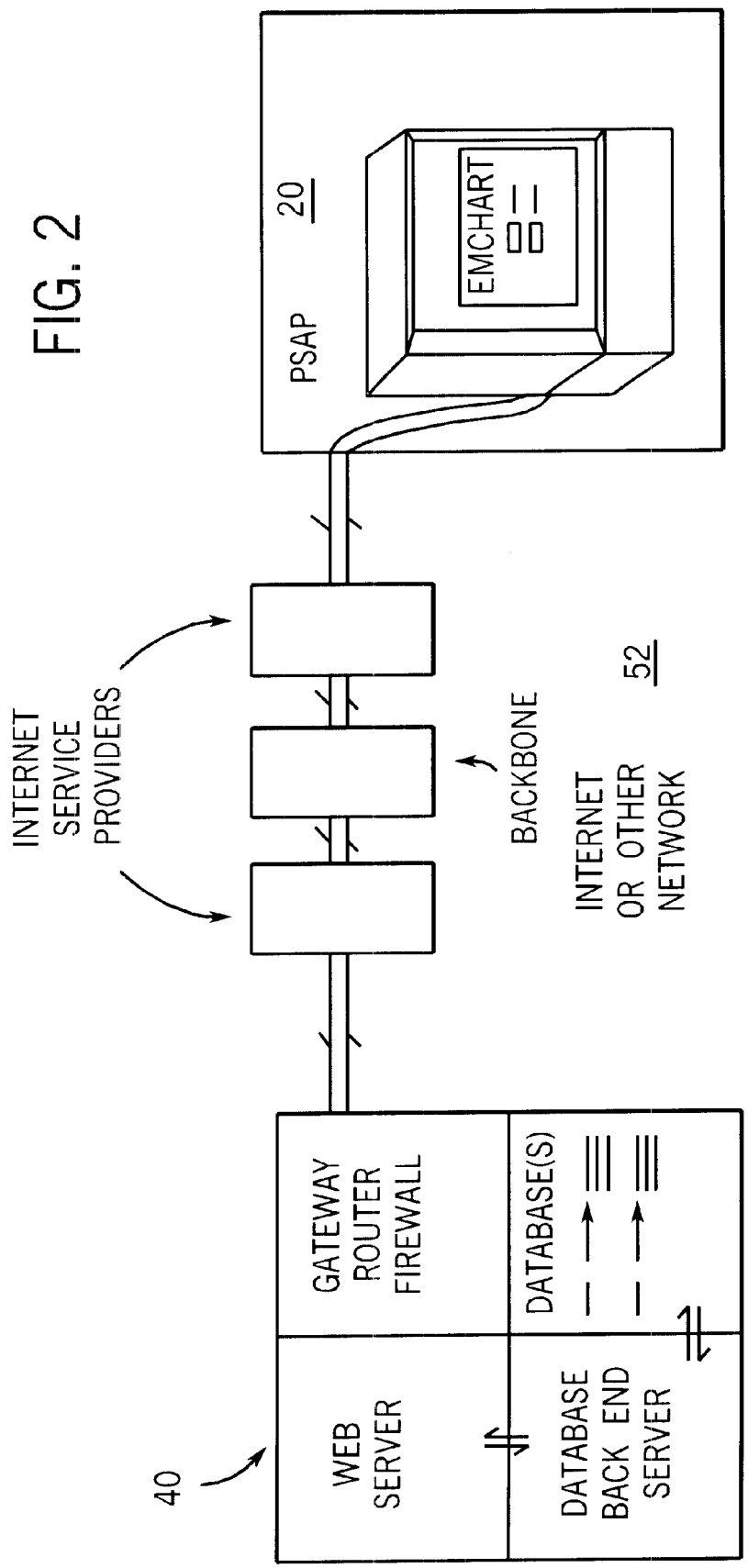
FIG. 2 is a block diagram displaying a means for a Public Service Answering point to access an emergency information data base using the World Wide Web.
Figure 3:
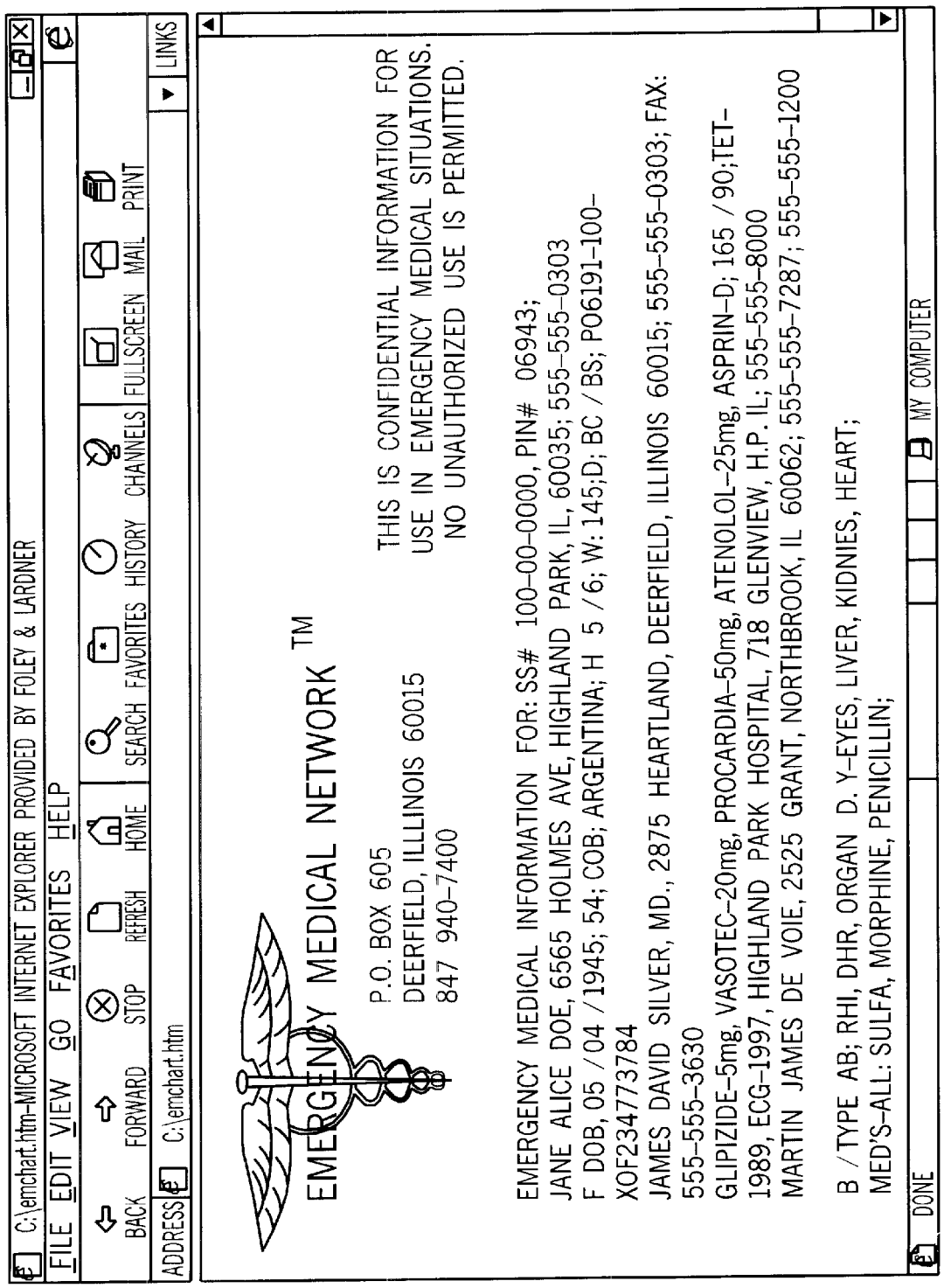
FIG. 3 shows a web page as interpreted by a browser, communicating the medical history of a fictitious subscriber.

After the identifying message has either been decodably or aurally communicated to the PSAP 20, and if the PSAP 20 has not automatically requested information from data base 36, the PSAP 20 can proceed with such an information request through a variety of means. As shown in FIG. 2, personnel of the PSAP 20 can use the Internet to access a web server provided by entity 40. The website will require the access code of the subscriber and, upon verification, upload or display the subscriber's emergency information, as shown in FIG. 3.

Alternatively, the PSAP 20 can use any other real time communication means to contact the entity 40, including standard telephone, FAX, pagers, email, etc. The present invention contemplates that a variety of communication means will be used (as shown in FIG. 1), such that each PSAP 20 will be able to use the most efficient data transfer means possible, regardless of its current state of technological advancement. After the PSAP 20 personnel have received information from the medical data base 36, the information can be provided by any communication means 54 to dispatched emergency response personnel 46 and to the treating facilities and treating physicians 50.

Figure 4:
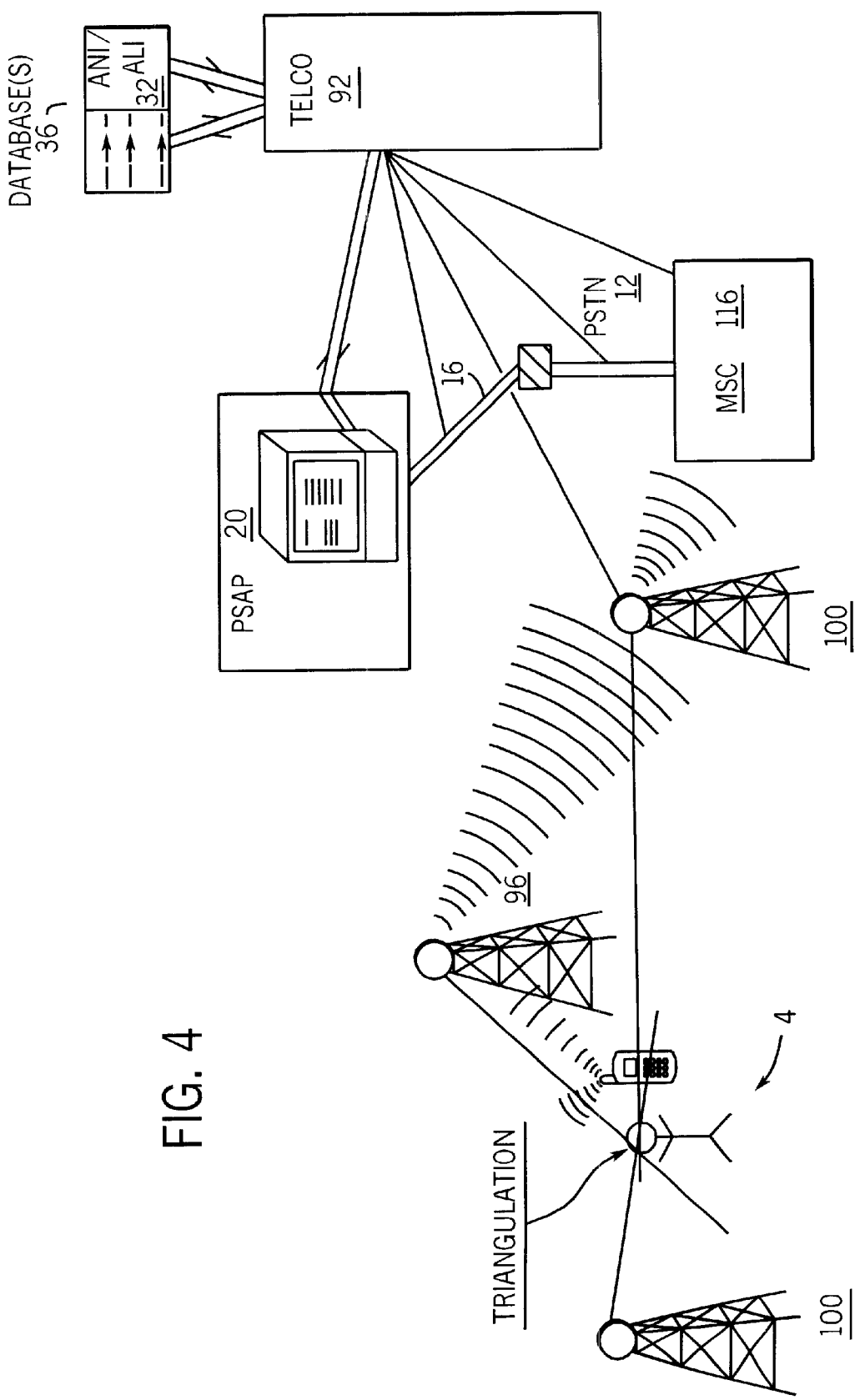
FIG. 4 is a block diagram showing the system organization of a second preferred embodiment.

In another embodiment of the present invention, as shown in FIG. 4, the entity providing telephone service (Telco) 92 can automatically detect the presence of an emergency call. In FIG. 4, a cellular system is shown, although the embodiment can encompass non-cellular systems as well. Distressed subscriber 4 places a cellular call which is picked up by base station 96. Base station 96 relays the call to other base stations 100, which relay to a Master Switching Center (MSC) 116. The MSC 116 forwards the call to a 911 trunk 16, to be answered at a PSAP 20.

Anywhere between the base station 96 and the PSAP 20 inclusive, Telco 92 determines that an emergency call has been placed, by methods well known in the art. Identifying information relating to the distressed subscriber 4 is automatically generated based on the signal picked up by base station 96. This can be done by accessing the ANI/ALI data base 32, described supra, enhanced with data base access information. Base station 96 can also work in cooperation with other base stations 100, performing triangulation to precisely locate the distressed subscriber 4. In non-cellular systems, location information can be provided from a data base (for a stationary phone) or from satellite positioning.

Telco 92 is then able to use the identifying information received from the cellular base stations 96 and 100 to access emergency data base 36. Data base 36 can be managed by independent private entity 40, by a public data base management entity (not shown) or by Telco 92. If the data base is managed by the Telco 92, there is less need for security, as the Telco 92 can restrict access to requests originating only from its own emergency response system. If Telco 92 does restrict access, however, a supplemental data base with greater security features should be used to allow access where the technological base required for the present embodiment is not present.

After Telco 92 has assembled the appropriate information (preferably in an unnoticeable time interval), the information is routed along with the emergency call to PSAP 20. The emergency information, or information required to access the emergency information, can be automatically displayed, printed, stored or relayed to appropriate response teams. If the information is not automatically relayed, the PSAP 20 can use any available means to communicate the information to appropriate persons or entities, as described in the first embodiment.

Figure 5:
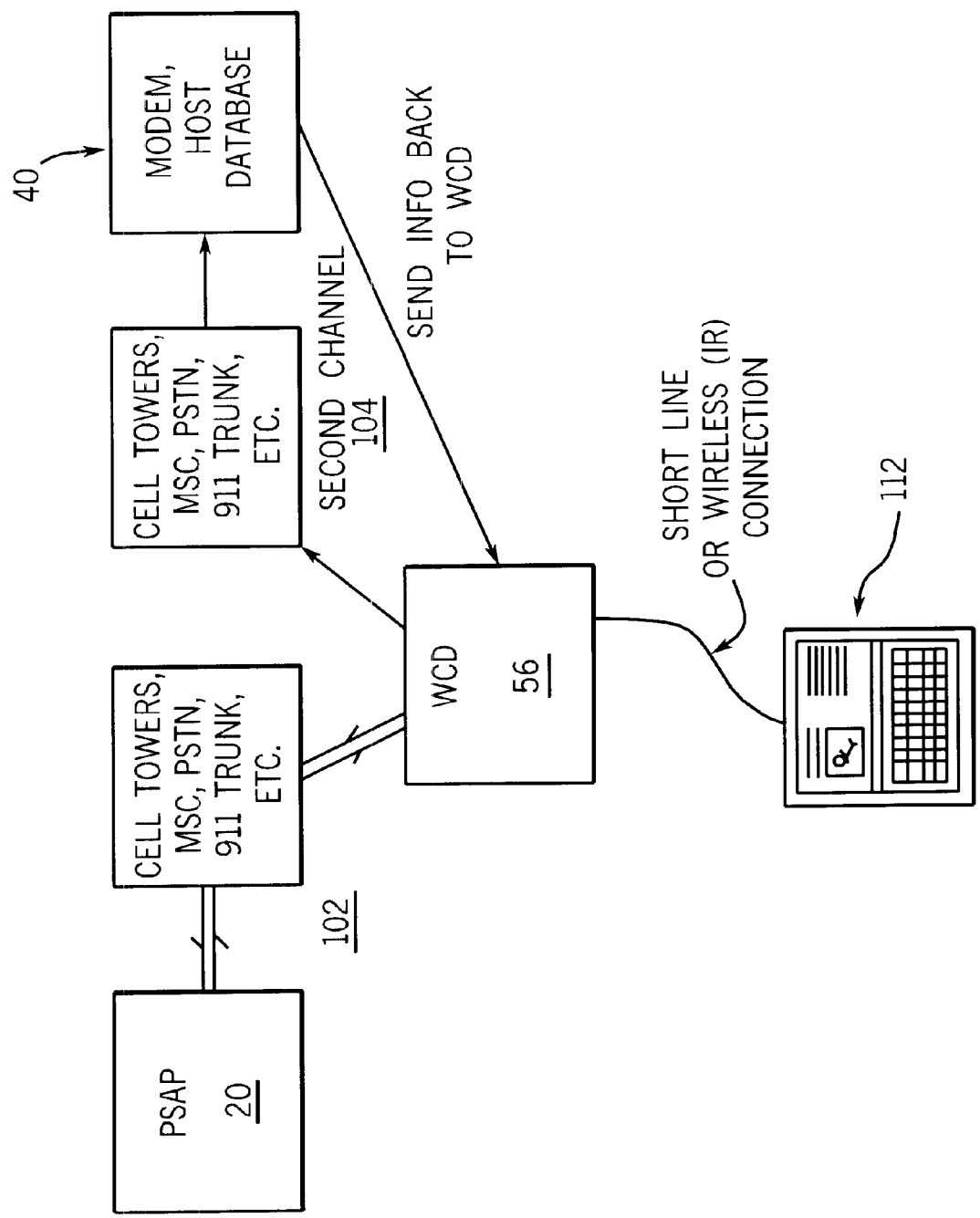
FIG. 5 is a block diagram showing the dual communication channels of a third preferred embodiment.

Another embodiment of the present invention is shown in FIG. 5. This embodiment is also described within the context of a cellular system, although other systems are usable. The distressed subscriber 4 uses a wireless communication device (WCD) 56 to place an emergency call 102. The WCD 56 is configured to either open a second communications channel 104 to the cellular system, or to open a communications channel 104 immediately after the termination of the primary emergency call. The WCD 56 then uses the communications channel 104 so opened to directly access data base 36. WCD 56 is configured to communicate with data base management entity 40 directly over the open channel 104, to provide protocol and access information.

WCD 56 has extended RAM to buffer information from data base 36 arriving over channel 104. Because most voice channels currently allow only 64 kbit/sec data rate, the present embodiment will be most advantageously used if Telco 92 allocates a high bandwidth channel for such information transfers.

If the quantity of information obtained by WCD 56 over channel 104 is not voluminous, it can be displayed on a display panel of WCD 56, or it can be converted to speech and audibly played through the microphone of WCD 46, by means well known to those of skill in the art. Alternatively, the information can be uploaded to an interfaceable device such as a hospital computer terminal or a portable computer 112. WCD 56 can provide a visual or audible alarm to alert emergency response personnel that information is buffered in the memory of WCD 56.

Of course, the embodiment depicted in FIG. 5 need not be limited to emergency information. It is contemplated that WCD 56 can be used to contact a data base that provides any type of information. The information is downloadable into the RAM of WCD 56 for subsequent transfer to a user, which can be another device. For example, a data base can provide identification information, credit information, security access information, address book information, marketing information, personal history information, mechanic's records, etc. The subscriber can even give a code to the device, specifying one of a number of data accounts owned by the subscriber. This embodiment will particularly useful for any information which is commonly given out, in places where World Wide Web access is limited (such as retail store check out counters).

The present invention may also be utilized as a two-way communication system to monitor persons with life-threatening illnesses and elderly persons living alone. Through the use of a data base containing the standard fixed site and/or the mobile telephone number of an individual's communication device, the individual may be automatically contacted at certain times or upon fulfillment of any other condition. A computer program can automatically interrogate the individual as to the individual's current well-being by asking a set of questions that are answered by the individual. The questions may be asked either verbally or on a display, and the individual may answer either verbally or by manipulating controls to produce the answer. Alternatively, the communication device can be configured to emit a distinctive signal alerting the individual that a computer interrogation is requested, and allowing the individual to communicate an "all is well" signal by manipulating a single control. This embodiment of the invention is particularly useful for helping individuals maintain a complicated regimen of medication.

Similarly, an individual can use the communication device to dial a computer-answered data base at certain time intervals or upon fulfillment of any other condition, enter an access code and indicate his or her medical condition. If no call is made, the computer can generate an exception report and contact a human for further action.

The information in data base 36 can be used in a number of beneficial ways. If the information stored in data base 36 is medical information, for example, an individual on a particular regimen of drugs can be compared with other individuals on similar regimens for similar reasons. Likewise, one can draw statistical conclusions about certain diseases, medications and the prevalence of certain conditions within a population cross section. This information can be useful to health authorities, such as those who determine what sort of medical supplies should be available for the treatment of the injured after a large scale disaster. The data base information and communication device can also be used in conjunction to notify authorities and residents in the vicinity of an impending disaster or disaster.

Turning now to the subscriber's communication device itself, the present invention contemplates that the subscriber 44 can use a variety of communication devices to make an emergency distress call. A standard household telephone can be used, of course, as can a wireless (radio frequency (RF)/cellular/satellite) telephone, a portable telephone (a phone that communicates with a receiver and relay to the PSTN 12), a mixed function portable/RF telephone (one which communicates to a PSTN relay, but to an RF tower or satellite or an RF transceiver outside of the PSTN relay range), an Internet device such as a palmtop computer with an wired or wireless connection, or combinations and variations of the aforementioned.

Because large areas of the world are not provided with wire communications or ground based wireless communication systems, and because an emergency can happen anywhere, the communication device for use with the present invention will, advantageously, be completely portable and operable through remote areas. Most advantageously, the communication device will be equipped with electronic circuitry to automatically detect and select for use the best available communication means, although manual switching can also be used. For example, such a communication device can be configured to switch from a wall-plugged standard telephone to a portable telephone which communicates wirelessly with a transceiver that relays to a PSTN, further to a telephone for cellular or other ground-based extended wireless communications, and ultimately to a satellite based telephone for use in extremely remote locations. The device so disposed can arbitrate between various communication means based on a variety of factors, including signal strength, reliability and cost.

Figure 6:
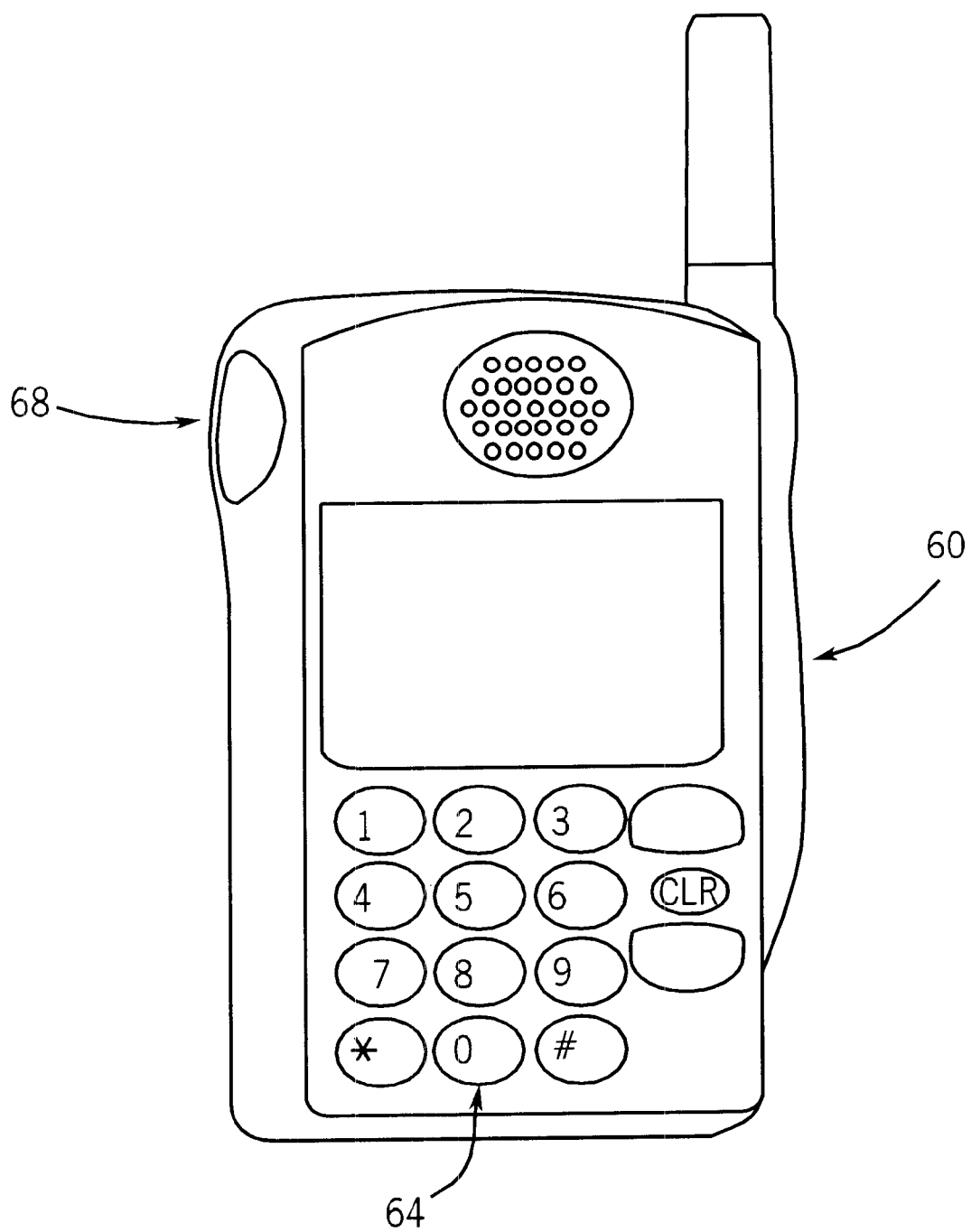
FIG. 6 shows a Wireless Communication Device for use with the present invention.
Figure 7:
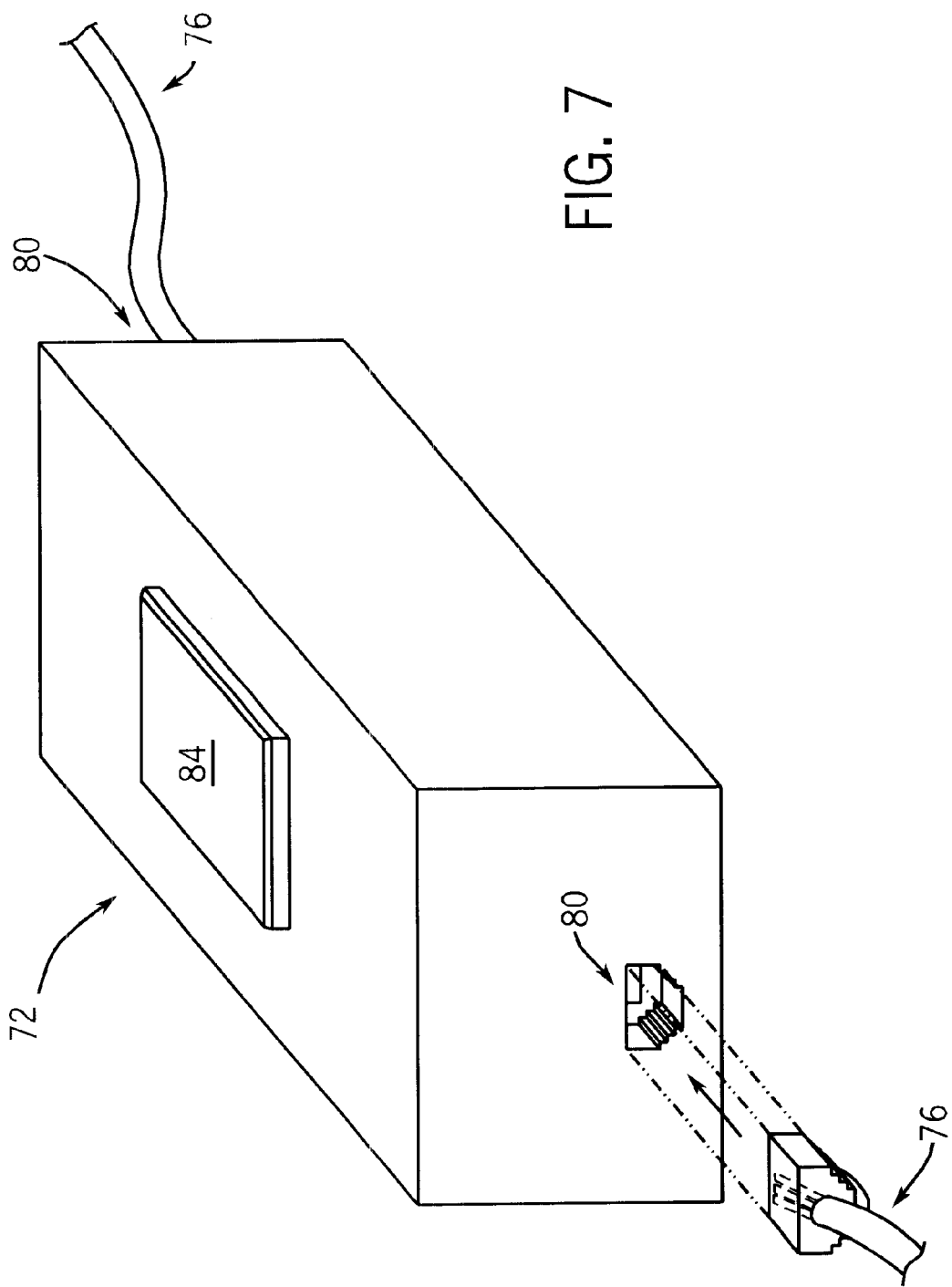
FIG. 7 shows an integratable module for use with the present invention.

The functionality required by the present invention can either be built into the device (for example, FIG. 6) or be provided as a module that can be integrated onto or into a primary communication device (for example, FIG. 7). FIG. 6 depicts one embodiment of a WCD 56 for use with the present invention. The WCD 56 contains a memory unit (e.g., an EPROM or similar device, not shown) for storing emergency telephone numbers and both a decodable and aural message including the subscriber's name, data base entity management identifier (to inform the PSAP 20 where to access the data base 36), data base index or access code (to allow the PSAP 20 to access the data base 36). The decodable and aural messages are translated into transmittable signals using a MODEM and voice synthesis chip (not shown) or other suitable means well known to those skilled in the art.

The WCD 56 has a standard housing 60 and number pad 64 for establishing wireless telephone connections. An emergency activation button 68 allows the user, in the touch of a single button, to turn the device 56 on, dial an emergency number and convey the decodable and aural signals of the present invention. This embodiment of the WCD 56 for use with the present invention is designed to allow the distressed subscriber 4, who may be losing consciousness, to quickly convey all necessary information to the PSAP 20.

Of course, there are many possible arrangements for the WCD 56, of which the following examples are illustrative. The WCD 56 can have no emergency activation button 68, but instead be configured to detect when the subscriber has placed an emergency call. The WCD 56 can have a plurality of activation buttons which can be pressed alone or in combination to correspond to different subscribers using the same phone. The WCD 56 can also be configured to activate in response to a sensed emergency condition. For example, the WCD 56 can be g-shock activated (to activate when a subscriber has fallen) or be configured to activate according to the fulfillment of a biometric condition, such as the failure of a pulse. These and other means of activation are well known to those of skill in the art, and can be applied to any device, including a standard telephone or radio transceiver, suitable for initiating contact with a PSAP.

FIG. 7 shows a module 72 that can be added to the standard home telephone 8 to produce the aural or decodable signals of the present invention. The module 72 can be easily installed by plugging two ends of a telephone line 76 into plugs 80. The module 72 has a one touch activation button 84, but can be configured to activate by means similar to those discussed with the WCD 56. Such modules 72 can come in a variety of forms, and can be integrated into the electronics of the communications device as well as externally attached. Such variations are well within the purview of one of ordinary skill in the art.

The module 72 has an emergency activation button 68 similar in function to the emergency activation button 68 on WCD 56 shown in FIG. 6. Module 72 can, of course, incorporate all variations of WCD 56 as described supra (g-shock activation can be implemented, but would be unnecessary).

The communication devices contemplated by the present invention can also have means to protect against accidental activation. For example, the emergency activation button 68 of WCD 56 shown in FIG. 6 is recessed to reduce the probability of accidental depression. The WCD 56 can have also have a protective cover, require two buttons to be pressed to activate, or use similar means which require little time and thought to be expended by the distressed subscriber 4 in order to activate the emergency function of the device. In addition, the communication devices can have a means to alert the user that the emergency functions of the device have been activated, such as an audible alarm or a vibration.

Figure 8:
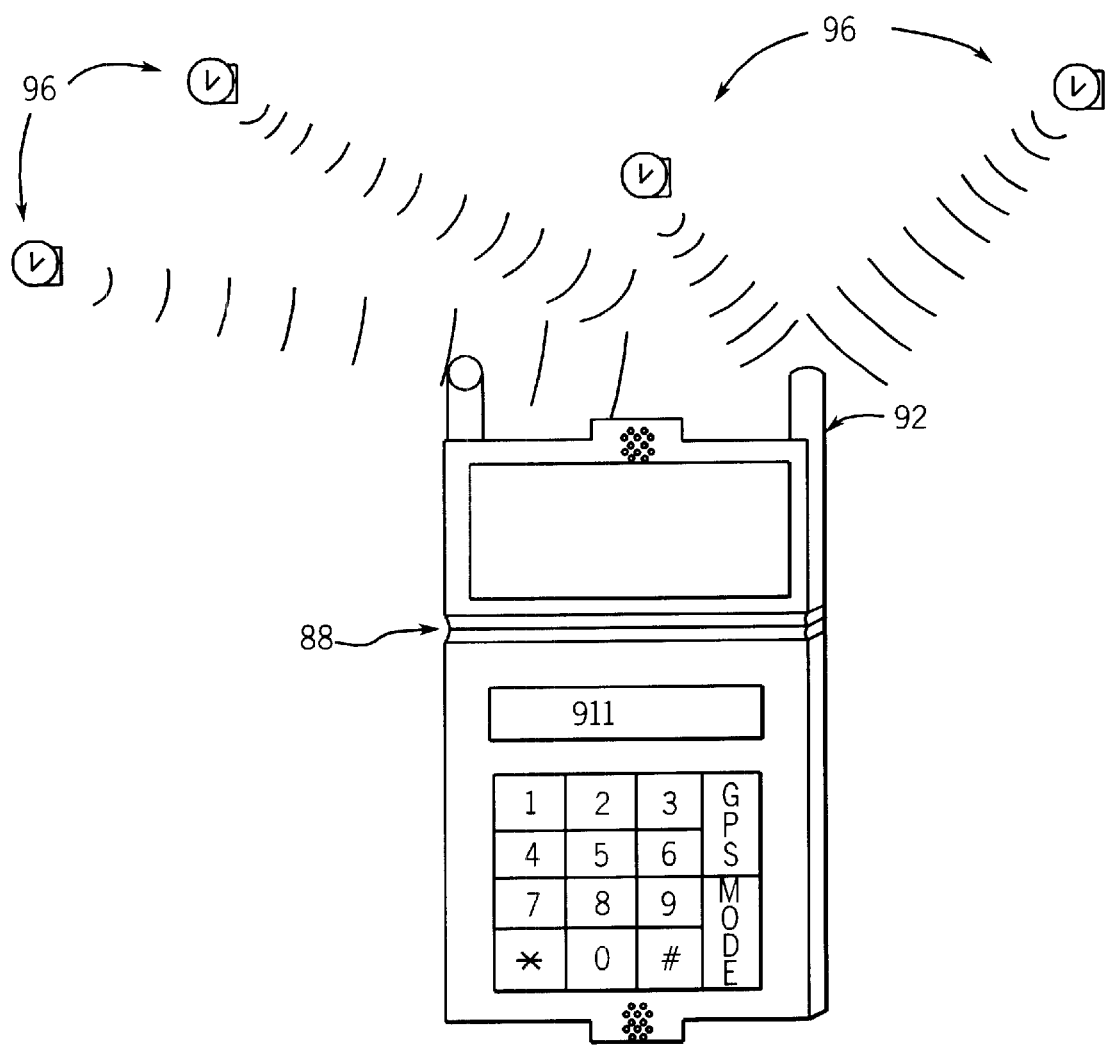
FIG. 8 shows a Positioning Wireless Communication Device for use with the present invention.

FIG. 8 shows a positioning wireless communication device for use with the present invention. The Positioning WCD 88 (PWCD) is equipped with a Global Positioning System (GPS) antenna 92. The PWCD 88, periodically or in response to the fulfillment of predetermined conditions, obtains position and time data from the network of GPS satellites 96. Voice chips or other circuitry convert the GPS data into an aural and possibly decodable signal that can be included with the identifying information described supra. For example, in this embodiment an aural message can be a verbal message stating "My name is John Doe. I'm having a medical emergency. I am a subscriber to X Company's medical information service, access code 718529G4. At twelve-twenty-four PM I was traveling in direction two hundred seventy degrees at fifty miles per hour, at thirty-five point zero one four degrees north latitude, sixty point seven six five degrees west longitude." The message, of course, can include basic medical information as well. The device can also translate latitude and longitude coordinates to local street addresses if sufficient mapping software is included within the device.

Alternatively, a PWCD 88 can obtain time and location information from nearby wireless base stations. For example, PWCD 88 can be able to obtain time information from synchronizing operations in a wireless system, and can be able to obtain location information directly from the current base station or as a function of base station transmitter strengths, locations or positions. Such data can then be processed similarly to GPS data, and included in the aural and possible decodable messages.

In yet another embodiment of the invention, emergency communications and/or other emergency information can be communicated to one or more emergency processing centers, such as an emergency medical center, by a subscriber from any one of a plurality of communications devices which are identified as being associated with the subscriber. In the modern world of electronic communications, individuals can have available the use of, for example, telephones, cellular phones, portable computer/telephones, computers and paging devices. The subscriber to such an emergency service can therefore choose to enable access to his or her emergency information (such as medical or even financial) from any of their associated communications devices. Further, the subscriber can enable access to the emergency information using any one of a plurality of personal identification numbers, such as social security number, driver's license number, banking numbers and the like. It should also be noted that a "subscriber" can be an individual or a group of persons such that emergency information of an entire group can be provided to emergency service providers. This has utility in situations where more than one person at a geographic location (a fixed site or a mobile location, such as for persons traveling) is in need of assistance. When emergency personnel reach the location they will then be equipped to deal with the needs of any and all persons in need of attention.

The ability, at will, to use of any single one of a multiplicity of associated subscriber identification numbers to gain access to a single data base file would have particular benefit and utility when used in conjunction with a public assistance system, such as an emergency 911 identification and dispatch service. Each single individual can have associated therewith, for example, a social security number, a drivers license number, as well as a multiplicity of residential and business telephone numbers. A single individual could thus have a primary, second or third residence and each residence having separate telephone numbers. Further, a single individual can have a multiplicity of mobile or cellular telephones or computer devices. It would have substantial utility to be able to identify a single individual from any one of such telephonic numbers and to gain access to personal, financial or medical data base files.

Furthermore, as described hereinbefore multiple members of a family or other group living at one address, or traveling together as a group, could also share the same one or more telephone numbers (fixed telephone or cellular), security codes or other communications unit identifiers intended for identification and data base access. In addition, further identifiers can be included to identify one particular individual of the group. This can be done by adding an additional personal identification number such as 1, 2 or 3 to one of the family numbers. This would identify them as the first, second or third family or other group member in some internally consistent manner. The embodiment can thus identify a single data base file of a single individual, or each of multiple individuals of a single household or other group. Note also that a group of individuals can be associated with a single identifying code number. The person or persons could therefore be using, or otherwise associated with, a multiplicity of telephones (or other communications devices) which can summon personal, medical or other emergency assistance from a 911 emergency dispatch center or other emergency assistance center. The ability to identify a single person or a single individual from a family of persons by the use of any one of a pre-selected grouping of identifying code numbers or communications device numbers to gain access to their personal or medical records contained in a data base is of particular importance in the practice of identifying individuals for the provision of 911 emergency medical or other emergency assistance. This is particularly true where the telephone (or other communications device) registered owner identification is linked to a public 911 call dispatch center. The ability to maintain and update the medical or personal data base of an individual that is linked to a single telephone number would be further complicated if the individual owns more than one telephone, all with separate numbers. A single data base file can therefore be created containing the personal, financial and/or medical information of each member of a family of individuals or group living at one household address or traveling together. Each data base sub-file of an individual would then be assigned a group of access codes, such as telephone or access code numbers associated with the individual, or another member of the family or group, and can include a personal identification number such as 1, 2 or 3, to allow an individual to be separately identified from a group, each of whom could be registered under a single or multiplicity of telephone numbers. This would allow access to each sub-file of a single data base record.

An example of one embodiment is that Mary Jones lives alone and has two telephone numbers, a residence telephone number of 662-444-7788 and a mobile telephone number of 899-432-9977. A data base file would be created for Mary containing her personal and medical record and be linked to an accessible by each of her telephone numbers. Mary would also be assigned a one to four digit personal identification number (PIN) such as 1 or 5432. In case of an emergency, if Mary summons assistance from one of her telephones by calling a 911 dispatch center, the center can identify Mary through the use of her telephone number and obtain her personal and medical information from a single data base file using either one of the telephone numbers that she owns and that are assigned to her data base file plus a personal identification PIN number assigned to her.

In another example, John, Jane, Mike and Sue Smith all live at one residence address. There are four household residence telephones each with separate telephone numbers and each registered to each of the four individuals, John, Jane, Mike and Sue. Additionally, each person has a mobile telephone number. The residential telephones of John, Jane, Mike and Sue are easily accessible to each of the family members and could be used to call a 911 dispatch center. Therefore, John, Jane, Mike and Sue will each be registered in the personal and medical data base using all four of the residential telephone numbers. John will be assigned PIN number 1, June number 3, Mike number 3 and Sue number 4. In case of an emergency, any one of the four family members can use any one of the four residential telephones to summon 911 assistance. The 911 dispatch center can access the data base of any one of the four family members by using any one of the four residential telephone numbers. The PIN number can be used to distinguish between the family members and their personal and medical individual data base files. In addition, each family member has a mobile telephone and each individual data base file is linked to and accessible by, not only the four residential telephone numbers, but by and to the single mobile telephone number of each individual. As a further example, John Smith is linked to the personal and medical data base by the use of the residential telephone numbers 818-949-8989, 818-949-9090, 818-949-6565 and 818-949-2323, as well as, his personal mobile telephone number 603-662-7799 and his personal PIN of 2345.

In yet another embodiment a subscriber to an emergency communication system can include a feature in a communications device which will allow transmission of emergency information to the subscriber's communications device. Upon receiving an emergency communication from the subscriber a remote data base can be accessed by an emergency service provider. Emergency information associated with that subscriber can then be retrieved from the data base and output to the subscriber's communication device. The subscriber can be a single individual or one of a group as described hereinbefore. Further, the subscriber can have a plurality of identifying numbers associated therewith, allowing the subscriber to communicate to an emergency service provider and in turn access subscriber emergency data using any of the identifying numbers and have the subscriber emergency information transmitted to any and all of the subscriber's communications devices. The transmission of the subscriber emergency data can be in any of a variety of formats, including without limitation digital, analog, and voice synthesis output.

This embodiment would be useful in a circumstance when a public assistance phone number, such as 911 emergency, is contacted from a communications device associated with a subscriber. When the emergency response personnel arrive at the subscriber location they could use the subscriber's communication device to contact a specific telephone number (or other device) linked to an automated caller identification system and the computer data base containing the data base file of the subscriber. The automated caller identification system would permit immediate access to the data file of the subscriber and immediately transmit the data file to the communications device associated with the subscriber.

In yet a further embodiment in a medical emergency when the subscriber arrives at an emergency medical facility, the automated caller identification system could be employed to identify the telephone number, a facsimile contact number or computer E-mail address of an inquiring emergency medical facility. This would be particularly useful in employing an automated security access system to permit authorized user only access to a data base containing the subscriber data base record. This identification system would assure that only authorized medical emergency departments or hospital personnel could access confidential subscriber data base files. The identification system could automatically match the hospital telephone number, facsimile contact number or E-mail addresses to such numbers or addresses stored in the identification system memory that are authorized to receive confidential subscriber information. After the appropriate match is completed, the information to be used by emergency personnel can then be automatically transmitted to a receiving communications device, such as, a voice telephone, fax machine or computer E-mail.

The embodiments of the present invention are naturally dependent on a number of support technologies which have been well described in the art. Those of skill in the art will recognize that a variety of different means exist for, as examples, the design of a communications device or attachable module, the generation and storage of identifying messages, the communication of those messages to the emergency response system, the communication means by which the emergency information data base is accessed, and the way in which the data base stores information. The embodiments disclosed herein are intended to be illustrative of these possible variants and should not limit the present invention. Rather the present invention should be limited only by the following claims.

What is claimed is:

1. A system for the communication of information stored in a subscriber data base to an emergency response system, comprising:

a subscriber communication device means for communicating from any one of a plurality of different locations a decodable message including at least one of an available plurality of associated subscriber data base access codes; and a communication link between the subscriber communication device means and the emergency response system allowing the subscriber communication device means to transmit from the any one of the plurality of different locations the decodable message to the emergency response system, whereby the emergency response system can assess the subscriber data base and provide information from the subscriber data base thereby enabling emergency action for the subscriber at one of the plurality of different locations.

2. The system as defined in claim 1 wherein the subscriber data base access codes comprise a plurality of communications device identification codes.

3. The system as defined in claim 1 wherein at least one of the subscriber data base access codes comprises a personal identification code.

4. The system as defined in claim 3 wherein the personal identification code comprises at least one of a driver's license number, social security number and a subscriber selected security code.

5. The system as defined in claim 1 wherein the subscriber communication device is selected from the group consisting of a telephone, a cellular telephone, a pager, a portable computer and a desk computer.

6. The system as defined in claim 1 wherein each of said data base access codes is associated with a plurality of subscriber data bases of a plurality of individuals in a group associated with a single geographical location.

7. The system as defined in claim 6 wherein said data base access codes are selected from the group consisting of a single telephone number, a single pager number, a single computer code, a security code, and a single social security number or driver's license number of one person normally located at the geographical location.

8. The system as defined in claim 1 further including at least one of a hardware component and a computer software program disposed in said communications device enabling receipt of the decodable message.

9. A system for the communication of information, stored in at least one of a plurality of subscriber data bases, to an emergency response system, comprising:

a communications device having the ability to communicate a decodable message including at least one of an available plurality of data base access codes associated with a single geographic location where a plurality of individuals are congregated on a regular bases, the system further having a plurality of data bases with each data base associated with one of the plurality of individuals; and a communication link between the communications device and the emergency response system allowing the communications device to transmit the decodable message to the emergency response system, whereby the emergency response system can access and have available for emergency use all of the subscriber data bases for the plurality of individuals at the single geographic location.

10. A system for the communication of information, stored in at least one of a plurality of subscriber data bases, to an emergency response system, comprising:

communications device means linked to a communications system that can determine at least one of a plurality of identification numbers associated with said communications device means and said identification numbers providable from any one of a plurality of different locations wherein said communications device means can transmit at least one of said identification numbers associated with a plurality of individuals of a group; and means for providing at least one of a plurality of said identification numbers to access one of the plurality of subscriber data bases, thereby enabling emergency personnel to obtain emergency information in said data bases and to provide emergency services at one of the plurality of different locations.

11. The system as defined in claim 10 wherein the communications device means includes at least one of a telephone in a building, a transportable telephone, a satellite based telephone, a computer and a pager.

12. The system as defined in claim 10 wherein said communications device is disposed at a fixed location.

13. The system as defined in claim 10 wherein said communications device is transportable and remains nearby at least a portion of the plurality of individuals.

14. The system as defined in claim 10 further including at least one of a hardware component and a computer software program disposed in said communications device enabling receipt of the emergency information.

15. The system as defined in claim 10 wherein the at least one of the identification numbers of the communication device means can be associated with all medical records of the plurality of individuals in the group and a further identification code can identify a medical record for each one of the group.

* * * * *